United States Patent [19]
Hans

[11] Patent Number: 6,076,586
[45] Date of Patent: Jun. 20, 2000

[54] APPARATUS FOR IMPROVING THE RUNNING QUALITY OF AIR TIRE VEHICLE WHEELS

[75] Inventor: Didier Hans, L'Isle Adam, France

[73] Assignee: Schenck Rotec GmbH, Darmstadt, Germany

[21] Appl. No.: 08/780,514

[22] Filed: Jan. 8, 1997

[30] Foreign Application Priority Data

Jan. 8, 1996 [DE] Germany .......................... 196 00 323

[51] Int. Cl.[7] .............................................. B60C 25/132
[52] U.S. Cl. .......................................... 157/1.17; 157/1.2
[58] Field of Search .................................. 157/1.1, 1.17, 157/1.2, 1.26, 1.28

[56] References Cited

U.S. PATENT DOCUMENTS

| | | |
|---|---|---|
| 2,647,564 | 8/1953 | Douglass . |
| 2,796,117 | 6/1957 | Pientkewic ................................ 157/1.2 |
| 2,890,745 | 6/1959 | Pientkewic ................................ 157/1.2 |
| 3,581,795 | 6/1971 | Bunch, Jr. . |

FOREIGN PATENT DOCUMENTS

| | | |
|---|---|---|
| 2733462 | 10/1996 | France . |
| 2333057 | 1/1975 | Germany . |
| 3442561 | 5/1986 | Germany . |

*Primary Examiner*—James G. Smith
*Attorney, Agent, or Firm*—W. F. Fasse; W. G. Fasse

[57] ABSTRACT

The running characteristics of a vehicle wheel with a tire are improved by applying axial pressure with a pressure application ring (26) which temporarily compresses the flanks of a tire (10) to such an extent that a portion of the axially outwardly facing surface of the respective tire bead lifts off from the respective rim flange. This permits the tire bead to press itself, in response to the air pressure in the tire, into the corner formed between a cylindrical portion of the rim and the flange portion of the rim. The ring-shaped pressure application ring (26) comprises a plurality of circumferentially arranged ring sectors (7). These sectors can be adjusted in their radially inwardly or outwardly to thereby adapt the diameter of the pressure application ring for use in connection with a wide range of tire diameters.

16 Claims, 3 Drawing Sheets

Fig. 3A
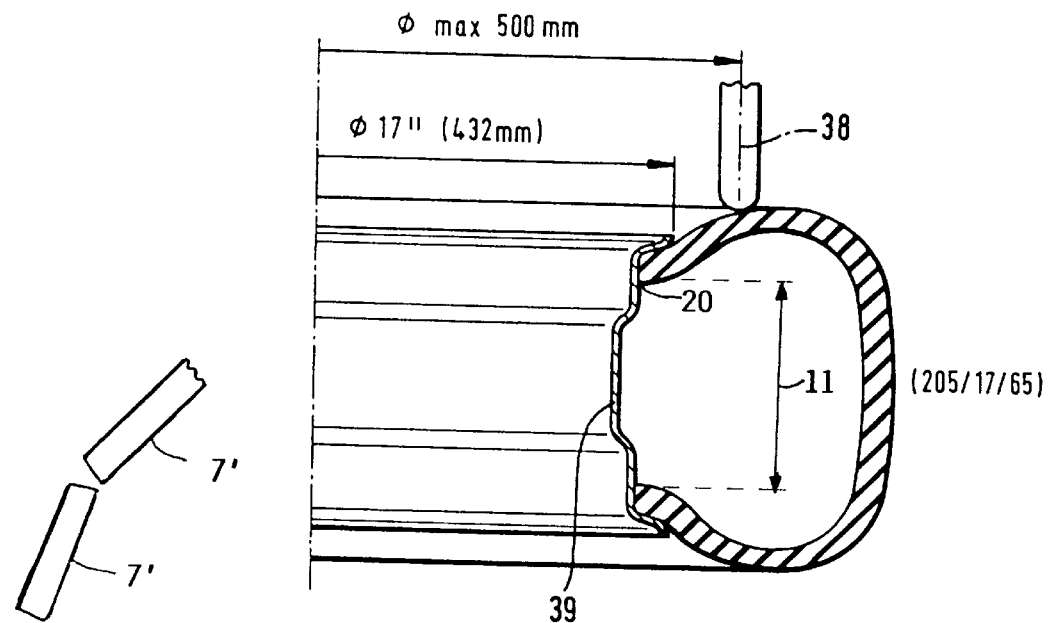
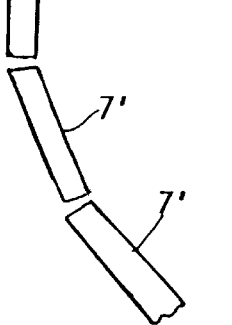
FIG. 4
FIG. 3B
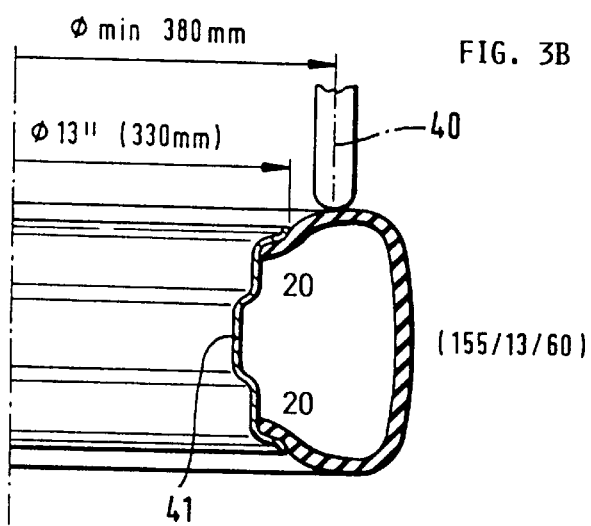

APPARATUS FOR IMPROVING THE RUNNING QUALITY OF AIR TIRE VEHICLE WHEELS

FIELD OF THE INVENTION

The invention relates to an apparatus for improving the running quality of air tire vehicle wheels. A ring-shaped pressure application element is used to temporarily press both tire flank walls axially inwardly so that a better contact between the tire beads and the wheel flange is achieved.

BACKGROUND INFORMATION

The mounting of a vehicle tire on its wheel rim may result in an inadequate circular contact between both tire beads and the respective rim flanges. Such inadequate or non-uniform contacts impair the desired or required true and balanced running characteristic of the respective tire. Furthermore, wheels with an initially inadequate tire seating may assume an improved or proper seating after actual use on the road. However, such self-seating if it takes place at all, sometimes requires a substantial distance of travel before the rotating motion of the tire properly positions the two tire beads between the respective rim flanges. This self-seating, however, although desirable from one point of view, is not desirable because it can adversely influence the wheel balance. In other words, the balancing of the wheel that takes place after the tire has been mounted on a rim, is disturbed by such self-seating or re-seating of the tire on the wheel rim. As a result, it would become necessary to perform a further balancing operation following a certain distance travelled. is known from German Patent Publication DE 3,442,561 C2 (Johannes), published on May 22, 1986, to improve the seat of a tire on its rim by an apparatus which is employed directly after mounting the tire on the rim. Johannes discloses to inwardly press the flank surfaces of the tire by two pressure rings with a force directed parallel to the rotational wheel axis. The axial force is applied radially outwardly of the wheel flange to such an extent that the lateral outer bead surfaces of the tire are slightly lifted off the respective wheel flange while the inwardly positioned tire bead surfaces remain in contact with the wheel rim and wheel rim flange. This force application is intended to cause the bead surfaces of the tire to fit precisely into the recesses provided in the area of the rim flanges. In the known apparatus the diameters of the pressure rings are adapted to an average diameter of the tire side surfaces of the particular wheel or tire type. This feature has the disadvantage that for each wheel type with different average tire flank surface diameters another apparatus is required or it is necessary to exchange the pressure application rings against other rings with different diameters.

German Patent Publication 2,333,057 (Kappel et al.), published on Jan. 16, 1975 discloses a method and apparatus for reducing radial and/or lateral or axial unbalances of vehicle wheels. Kappel et al teach in their method that an air-filled tire on a wheel is pressed axially along its flanks or side walls by a pressure ring to such an extent that the tire beads are lifted off the rim flanges to release the air, whereupon the rim and the tire are rotated relative to each other and then the tire is again filled with air. In the known apparatus the wheel is mounted on a rotatable clamping head while the pressure application ring is mounted also on a rotatable head opposite the wheel carrying head. The pressure application ring on one flank of the tire cooperates with a counter tool that is pressed against the other or opposite tire flank. The cooperation of these two tools, namely the ring and the counter tool sufficiently remove the tire beads from the rim flanges so that air can escape from the tire. The clamping head or the opposite mounting head are rotatable so that either the rim or the tire or both are rotatable relative to each other by a respective drive. A pressurized air tank is provided to refill the tire after the adjustment has been made. Such an apparatus also leaves room for improvement, especially with regard to the possibility of handling various tire sizes on the same machine.

OBJECTS OF THE INVENTION

In view of the above it is the aim of the invention to achieve the following objects singly or in combination:

to improve an apparatus of the type described above in such a way that wheels of different tire sizes or different wheel dimensions can be handled on the same apparatus;

to construct the apparatus in such a way that it is suitable for improving the seating of the tires on the respective wheel rim even if the particular tire have different tire cross-sectional configurations including so-called low profile tire cross-sections;

to assure by the present tire treatment a symmetrical seating of the tire on its rim, whereby each tire bead sits mirror-symmetrically against its rim flange relative to the opposite tire bead and rim flange;

to construct the present apparatus in such a way that two identical machines can be arranged axially opposite each other to perform the seating improvement on both tire flanks simultaneously; and to construct the apparatus in such a manner that it can be easily integrated into a fully automated wheel assembly and wheel balancing operation.

SUMMARY OF THE INVENTION

The present apparatus is characterized in that a pressure application ring comprises a plurality of ring sectors which are arranged one behind the other in the circumferential direction and these ring sectors cooperate with an adjustment mechanism that permits the radial displacement of the ring sectors relative to each other to make the pressure application ring larger or smaller in its diameter for treating wheel tires of different sizes.

It is an advantage of the invention that such an apparatus can be used not only for wheels having different rim diameters, but that it can also be used on wheels carrying tires with different cross-sectional configurations such as so-called low profile tires. Such an apparatus is easily integrated into a manufacturing sequence including tire mounting, inflating, and balancing equipment because the continuous or stepless radial adjustment of the pressure applying ring sectors is easy and can be precisely performed even by automatically controlled adjustment components so that wheels of different sizes or diameters or cross-sectional tire configurations can be handled on an assembly line. The present construction has the further advantage that the continuous adjustment of the pressure application ring sectors does not require any set-up time.

BRIEF DESCRIPTION OF THE DRAWINGS

In order that the invention may be clearly understood, it will now be described, by way of example, with reference to the accompanying drawings, wherein:

FIGS. 3A and 3B show schematically the radial adjustment range of an apparatus according to the invention for improving the running characteristics of conventional vehicle tire wheels; and FIG. 4 shows schematically straight ring sectors for forming a polygonal pressure application ring.

DESCRIPTION OF PREFERRED EXAMPLE EMBODIMENTS AND OF THE BEST MODE OF THE INVENTION

Figure 1:
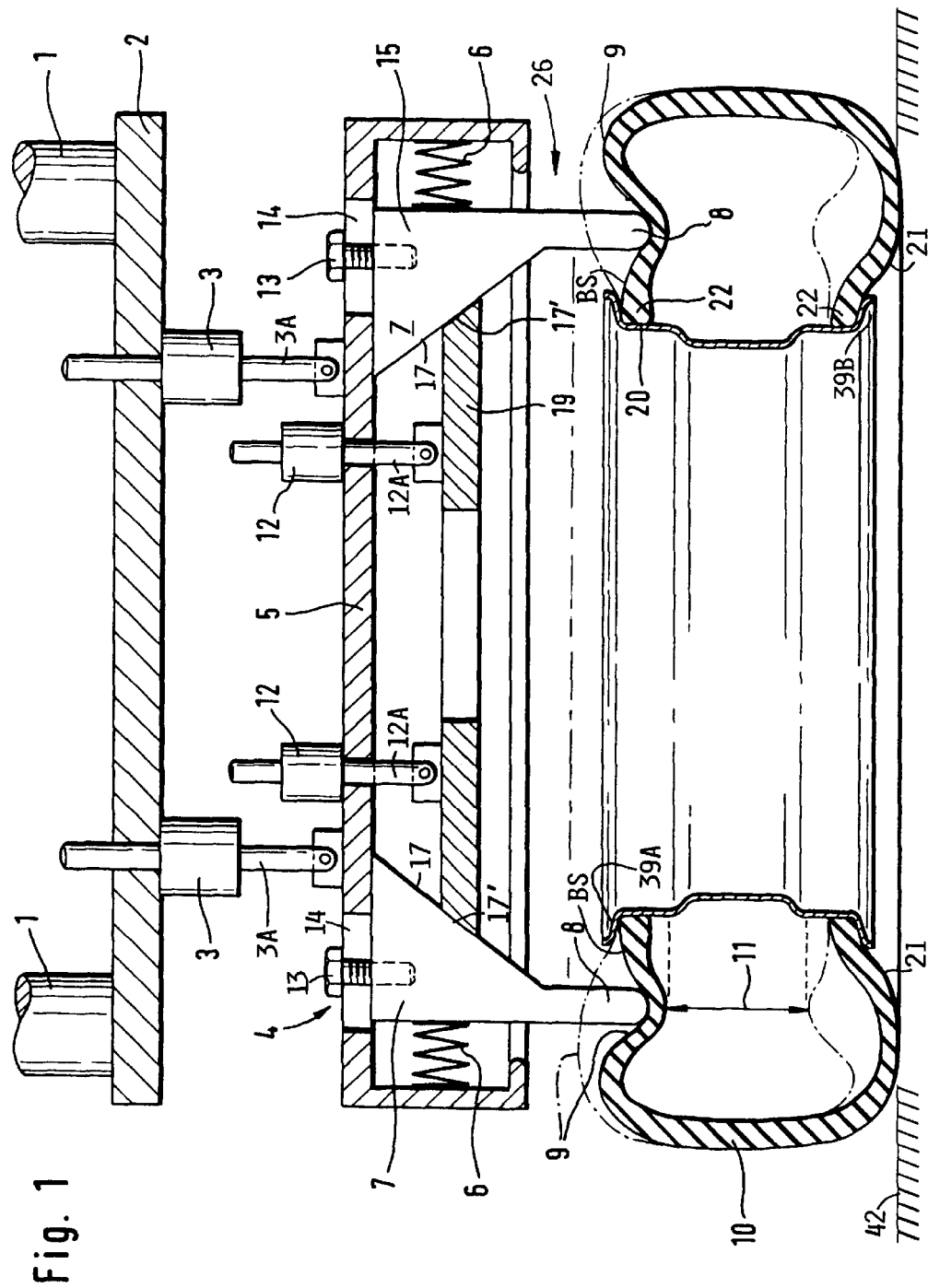
FIG. 1 is an elevational, sectional view through an apparatus according to the invention for improving the running characteristics or qualities of wheels with air tires, illustrating a feature for an automatic radial adjustment of the pressure applying ring sectors.

FIG. 1 shows a schematic illustration of an apparatus according to the invention for improving the running characteristics of vehicle wheels with pneumatic tires 10 wherein a pressure application ring 26 has a plurality of continuously or steplessly adjustable ring sectors 7 which are positioned to apply pressure to the side walls or flanks 9, 21 of a wheel tire 10 filled with air. The side flanks 9, 21 of the tire are deformed to such an extent that an outer flank surface BS next to the tire beads 22 is temporarily bent away from the respective rim flange 39A or 39B of the wheel rim 39 while the tire is inflated. Due to this bending of the flank surface BS the tire bead 22 tends to move, under the air pressure in the tire, into intimate contact with the corner formed by the rim flange 39A, 39B and the rim 39 itself. This intimate contact is maintained by air pressure in the tire even when the ring 26 is removed. In order to achieve this bending of the tire flank surfaces BS the invention provides an apparatus having a machine frame 1 supporting or carrying a stationary mounting plate 2 carrying piston cylinder devices 3 for applying the axially directed force for the temporary deformation of the tire flank to improve the contact between the tire beads 22 and the rim flanges 39A and 39B. The piston cylinder devices 3 are rigidly secured to the plate 2 and carry with their piston rods 3A a cylindrical relatively flat mounting or support housing 5. Operation of the piston cylinder devices 3 move the housing 5 up or down. Downward movement of the piston rods 3A presses the ring sectors 7 with their tire contact projections or noses 8 against the tire flank surfaces 9 or 21, respectively. The rim 39 with its tire 10 filled with air under pressure rests on a support 42 that may be part of a conventional tire mounting or wheel balancing machine.

The horizontal arrangement with a vertical force application as shown is not necessary. A vertical arrangement with a horizontal force application works just as well. In both instances the rotational wheel axis extends in parallel to the direction of force application. It is also possible to provide two of the present devices, whereby one device is arranged on each side of a tire in order to simultaneously deform both flank surfaces 9 and 21. The orientation of both devices would be either horizontal or vertical.

The movable section with its housing 5 of the present apparatus holds a plurality of pressure application ring sectors 7 mounted in the housing 5 for radial adjustment to contact wheel flank surfaces 9, 21 of various size tires by way of an automatic adjustment to these different tire sizes. An adjustment mechanism 4 comprises elongated guide holes 14 in the upwardly facing wall of the housing 5. Adjustment screws 13 reach through these elongated holes 14 and into the respective ring sector 7. At least one such elongated guide hole 14 is provided for each ring sector 7. For example, twelve such sectors 7 are arranged to form the pressure application ring 26 as will be described in more detail below with reference to FIG. 2. Each of the sectors 7 has at least one tire contact projection or nose 8 respectively. These pressure application projections 8 are elongated in the circumferential direction and rounded at their edges to form together the pressure application ring 26 for the particular tire size to properly contact the ring area on the tire flank surfaces 9, 21.

Referring to FIG. 1, each ring sector 7 comprises a radially inwardly and downwardly facing slanted surface 17 cooperating with a respective surface 17' of a position adjustable inner ring member 19 supported by at least one piston cylinder device 12 having a piston rod 12A secured to the upwardly facing surfaces of the adjustable ring 19. The piston cylinder devices 12 are mounted to the housing 5. The cooperation of the slanting surfaces 17' of the ring 19 with the slanted surfaces 17 of the ring sectors 7 provides a continuous stepless radial position adjustment of the ring sectors 7 from a maximum diameter $D_{MAX}$ to a minimum diameter $D_{MIN}$, see FIG. 2, whereby the screws 13 hold the adjusted sectors 7 in place when tightened, but permit their radial movement when loosened. The adjustment ring 19 is movable up and down. When the ring 19 is moved up by the piston cylinder devices 12, the ring sectors 7 move radially outwardly against the force of return springs 6. When the ring 19 is moved downwardly by the piston cylinder devices 12, the springs 6 move the sectors 7 radially inwardly. In this manner a synchronous adjustment of the radial position of all the ring sectors 7 is accomplished simultaneously.

The continuous stepless adaptation of the diameter of the pressure application ring 26 by the radial displacement of its ring sectors 7 to achieve a required ring diameter corresponding to the intermediate or mean diameter of the tire flanks to be deformed, can also be achieved by constructions other than the one described above. For example, it is possible to drive each ring sector element with its own linear drive toward and away from the axial center of the pressure application ring 26. All individual drives would be operated in synchronism so that a continuous or stepless change of the diameter of the pressure application ring 26 is achievable. Mechanical adjustment systems such as are used for example in chucks for holding drill bits or jaw chucks for holding a work piece on a turning lathe can be used for achieving a continuous stepless adjustment of the diameter of the pressure application ring 26. Any suitable hydraulic, pneumatic, or mechanical lever adjustment mechanism can also be used to achieve the intended diameter adjustment of the ring 26.

In operation when a wheel with an inflated tire is to be treated on an apparatus of the invention for improving the running characteristic of the wheel, the tire is mounted on the wheel rim and inflated, the air pressure is checked, and the wheel is centered on the support 42 relative to the rotational center axis of the pressure application ring 26 which must coincide with the center axis of the wheel. These preliminary steps can be performed manually or automatically on a tire mounting or wheel balancing machine of which the support 42 may be a part. To ascertain or provide the required operational diameter of the pressure application ring 26, the known tire size or wheel diameter is entered in a keyboard or ascertained automatically by respective sensors not shown. The respective data are then processed in a computer not shown to provide the mean tire flank diameter to which the ring diameter must be adjusted for the pressure application.

Figure 2:
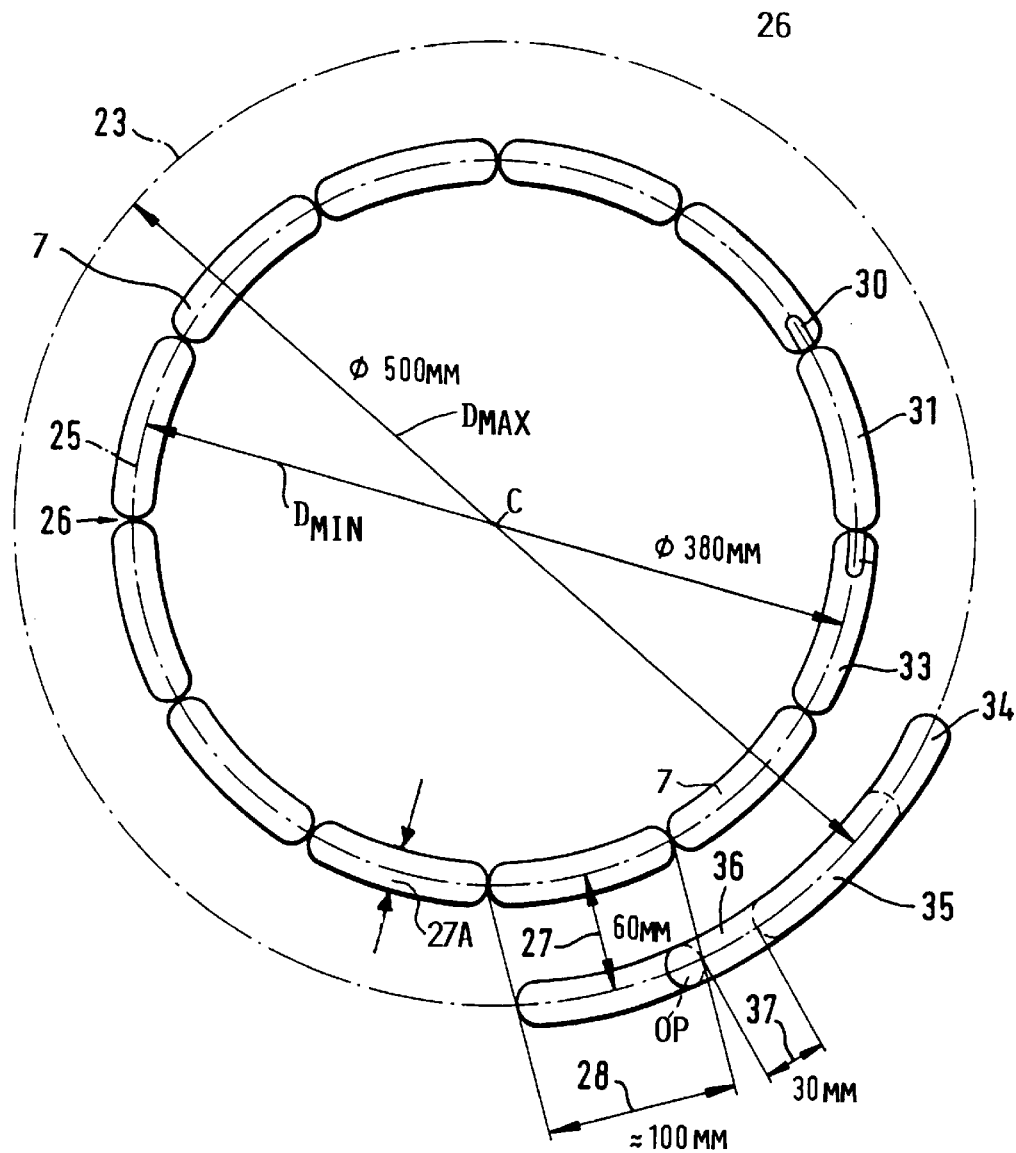
FIG. 2 shows a top plan view of schematically arranged ring sectors of a pressure application ring.

Referring to FIG. 2, a pressure application ring 26 comprises, for example, twelve ring sectors 7 capable of being adjusted within a diameter range of for example thirteen to seventeen inches which applies to most conventional passenger car wheels. All ring sectors 7 are adjustable as described above in the radial direction between a largest on-center circle 23 having a diameter $D_{MAX}$ and a smallest on-center circle 25 having a diameter $D_{MIN}$. The diameter difference in the radial direction is shown at 27. The tire contact projection or nose 8 of each of the ring sectors 7 has a thickness 27A in the radial direction within the range of 20 to 30 mm. Each ring sector 7 further has a length 28 in the circumferential direction corresponding to about 100 mm. The pressure application ring 26 according to the invention is not limited to the use of twelve ring sectors 7. More or fewer ring sectors 7 may be used. However, a very efficient and practical division into twelve ring sectors 7 has been found to be advantageous.

The ring sectors 7 are curved with a radius of curvature having its origin in the center C. The radius of curvature advantageously has a length corresponding to a radius intermediate between a radius providing the maximum diameter $D_{MAX}$ and a radius providing the minimum diameter $D_{MIN}$. Where a large number of pressure application ring sectors 7 is used to make up the pressure application ring 26, it is possible that each ring sector 7' is straight as shown in FIG. 4, thereby forming a polygon that sufficiently approximates the circular shape required for the pressure application to the tire flanks 9, 21. In all embodiments the surface areas of the projections or noses 8 of the sectors 7, 7' facing the respective tire flank 9, 21 are rounded along all edges to avoid damage to the tire 10 when pressure is applied to the tire flank. As shown in FIG. 2, the individual sectors 7 are arranged one behind the other in the circumferential direction to form together the pressure application ring 26.

When the sectors 24 are adjusted from the minimum diameter $D_{MIN}$ position to a position forming a larger diameter ring 26, a spacing or gap 37 in the circumferential direction is formed between neighboring sectors 24. That spacing or gap 37 is shown for the maximum diameter circle 23. A certain spacing is tolerable without adversely affecting the operation of the pressure application ring 26. However, it is also possible to bridge these spacings 37 by overlapping extension tongues 34 and 36 to form tongued ring sectors 35 as shown in the lower right-hand corner of FIG. 2. Such tongues 34, 36 can be made from sheet metal, whereby the inner contour of the extension tongues corresponds to the outer contour of the tongued ring sectors 35. One end of a tongue is connected to its sector while the other tongue end is free to overlap or bridge the gap 37. The length of the tongues 34, 36 is such that in response to a radial displacement outwardly, a sector 7 not provided with at least one tongue would still be taken along since the tongues would ride along these sectors 7 so that always a ring-shaped pressure application surface area is formed by the ring 26 without any gaps between neighboring sectors 7. A certain overlap OP is preferred also when the tongued ring sectors 35 are in the largest diameter $D_{MAX}$ forming position. In the given example, the gaps 37 can have a size of up to 30 mm for an outer or maximum diameter $D_{MAX}$ of 500 mm so that the circumferential length of the tongues 34, 36 should be at least 40 mm leaving an overlap OP of 10 mm.

Instead of bridging the gaps 37 with overlapping tongues 34, 36, it is possible to provide ring sectors 31 at their ends with an extension 30 at one end and a sliding fit hole 32 at the other end of each ring sector 31. The extensions 30 fit into the holes 32. It is also possible to provide one set of ring sectors with extensions 30 while the other set of ring sectors is be provided with holes 32 so that again the gaps 37 would be bridged.

FIGS. 3, 3A illustrate conventional tire sizes. The present apparatus is primarily, but not exclusively dimensioned for handling these tire sizes. FIG. 3 shows a standard profile tire for a seventeen inch wheel rim, while FIG. 3A shows a so-called low profile tire for a thirteen inch wheel rim. Assuming normal cross-sectional ratios in the range of 60 to 65%, one obtains an average tire flank diameter within the range of 380 to 500 mm. These flank diameters are shown at $D_{MIN}$ and $D_{MAX}$ in FIG. 2 and at 40 and 38 in FIGS. 3 and 3A, respectively. In order to cover this range of diameters, it is necessary that the ring sectors 7 can move radially along a distance 27 of about 60 mm, see FIG. 2. For a wheel rim 41 shown in FIG. 3B having a rim diameter of 13 inches and a cross-sectional ratio of 60%, the average tire flank diameter 40 would be 380 mm. Similarly, a wheel rim 39 shown in FIG. 3A having a diameter of seventeen inches, and a cross-sectional ratio of 65% an average wheel flank diameter 38 of about 500 mm would be required.

In view of these given dimensions, the sloping surfaces 17 and 17' of the adjustment mechanism 4 shown in FIG. 1 must be dimensioned with due regard to the just mentioned values. If tires 10 shown in FIG. 1 have different dimensions and different cross-sectional area ratios as are present in so-called low-profile tires, other average flank diameters are to be ascertained and the present pressure application ring 26 must be adjustable in its diameter, accordingly. The adjustment is preferably made automatically to achieve the desired ring diameter. Once the required ring diameter is adjusted for the ring sectors 7 to form the ring 26, the by housing 5 is moved by pressurizing the cylinder or cylinders 3 to such an extent that the projections 8 contact the tire flank surfaces 9 or 21. The pressure application motion is continued so that the tire side wall is deformed from the dash-dotted line to the full line position as shown in FIG. 1. The pressure application is sufficient when the axially outer surface BS separates slightly from the rim flange 39A or 39B, respectively. The deformation in the axial direction of the flank walls 9, 21 takes place against the inner compression within the air filled tire and only to such an extent that the beads 22 of the tire 10 do not lift off from the radially inner seating surfaces 20 of the rim 39 or 41. This displacement of the tire flanks axially inwardly corresponds approximately to a clearance 11 shown in FIGS. 1 and 3. This clearance 11 is defined between the inwardly facing edges of the tire beads 22 when the tire is not compressed as shown in FIG. 3. In other words, as the outer flank wall including the outer bead surface BS moves axially inwardly, the inner edge of the tire beads moves slightly axially outwardly to intimately contact the corner formed by the rim flange 39A, 39B and the rim. Due to this "lifting" of the tire beads 22, the tire beads slide in response to the internal pressure in the tire into a precise fit in the corner between the rim and the rim flange. This corner area has the required recesses into which the beads fit themselves in response to this treatment. As a result, the running characteristics of the wheel are improved by the symmetric seating of the tire on the rim. The application of this pressure need not be performed in a single step or stroke. Rather, it is possible to apply a plurality of smaller pressure steps with different amplitudes and/or at different frequencies.

In order to properly improve the running characteristics, it is necessary that each surface or rather flank surface 9 and 21 of the tire 10 is deformed relative to the rim 39 or 41. For this purpose the apparatus of FIG. 1 can be duplicated mirror-symmetrically and the other half not shown in FIG. 1 would be arranged below the tire 10 in axial alignment with the shown upper half. However, it is also possible to simply turn the wheel with its tire so that the same apparatus can treat both flank surfaces 9 and 21, one after the other. When providing two such machines in mirror-symmetrical arrangement, it is possible to position these pressure application mechanisms in a vertical orientation so that the rotational axis of the wheel would extend horizontally rather than vertically. In both embodiments with the vertical orientation and the horizontal orientation the two mechanisms are preferably operated in synchronism to treat both flank surfaces 9 and 21 simultaneously.

The present apparatus is especially suitable for integration into a wheel mounting system including a compressed air source for tire inflation and/or a wheel balancing apparatus. Such a system is then capable of a fully automated tire mounting, tire seating treatment and wheel balancing. Such a system can be operated in a cost efficient and time saving manner while still providing a quality improvement in the tire mounting and in the resulting product.

Although the invention has been described with reference to specific example embodiments, it will be appreciated that it is intended to cover all modifications and equivalents within the scope of the appended claims.

What is claimed is:

1. An apparatus for improving the running quality of vehicle wheels of different sizes having air tires on rims, said apparatus comprising a machine frame (2), a support housing (5), a drive (3) movably securing said support housing to said machine frame (2) for moving said support housing in a pressure application direction, at least one pressure application ring (26) mounted in said support housing (5), said pressure application ring (26) comprising a plurality of position adjustable ring sectors mounted in a ring row in said support housing (5) for adjusting said ring sectors radially for increasing or decreasing a diameter of said pressure application ring (26) in accordance with said different sizes, each of said ring sectors having a projection (8) for contacting a tire flank surface (9, 21), said apparatus further comprising an adjusting mechanism (4) for shifting said ring sectors (7) radially back and forth with at least a radial movement component between a smallest diameter ($D_{MIN}$) ring sector first position for said pressure application ring (26) and a largest diameter ($D_{MAX}$) ring sector second position for said pressure application ring (26) and to any position between said first and second positions, and wherein said adjusting mechanism comprises a further drive (12) positioned for cooperation with and adjustment of said ring sectors (7) in synchronism with each other.

2. The apparatus of claim 1, wherein each of said ring sectors (7) has a length (28) in the circumferential direction of said pressure application ring (26) determined by a given angular sector of said pressure application ring (26), each ring sector having a radius of curvature corresponding at least to a minimum radius of said pressure application ring (26) and at the most to a maximum radius of said pressure application ring (26).

3. The apparatus of claim 1, wherein each of said ring sectors is straight so that said plurality of ring sectors together form said pressure application ring as a polygon.

4. The apparatus of claim 1, further comprising overlap elements (30, 32, 34, 36) extending from ends of said ring sectors in the circumferential direction for bridging circumferential gaps (37) between neighboring ring sectors when said ring sectors are adjusted to form said pressure application ring with a diameter larger than a given minimum diameter ($D_{MIN}$).

5. The apparatus of claim 1, wherein said projections (8) for contacting a tire flank surface (9, 21) comprise rounded edges, said projections having a radial width (27A) corresponding at the most to about one half of a radial width of said tire flank surface.

6. The apparatus of claim 1, wherein said further drive is an automatic drive responsive to control signals representing pressure application ring diameters within the range of $D_{MIN}$ to $D_{MAX}$.

7. The apparatus of claim 1, further comprising a support (42) for said tire (10), and one pressure application ring mounted in said machine frame opposite said support for applying pressure to said tire flank surface (9, 21) of a wheel tire on said support.

8. The apparatus of claim 1, comprising two of said pressure application rings positioned in said machine frame in axial alignment with each other for simultaneously treating both tire flank surfaces (9 and 21) of a tire (10).

9. The apparatus of claim 1, further comprising a tire mounting machine (42) positioned for cooperation with said apparatus.

10. The apparatus of claim 1, further comprising a wheel balancing machine (42) positioned for cooperation with said apparatus.

11. An apparatus for improving the running quality of vehicle wheels of different sizes having air tires on rims, said apparatus comprising a machine frame (2), a support housing (5), a drive (3) movably securing said support housing to said machine frame (2) for moving said support housing in a pressure application direction, at least one pressure application ring (26) mounted in said support housing (5), said pressure application ring (26) comprising a plurality of position adjustable ring sectors mounted in a ring row in said support housing (5) for adjusting said ring sectors radially for increasing or decreasing a diameter of said pressure application ring (26) in accordance with said different sizes, each of said ring sectors having a projection (8) for contacting a tire flank surface (9, 21), wherein said support housing (5) comprises at least one radially extending guide slot (14) for each of said ring sectors (7) mounted for radial guidance by said guide slots (14), each ring sector (7) comprising a radially outwardly facing surface and a slanted radially inwardly facing surface (17), said apparatus further comprising a position adjusting mechanism (4) including an inner adjustment ring (19) having a radially outwardly slanting surface (17') bearing against said radially inwardly facing slanted surface (17) of all of said ring sectors, and a further drive (12) supported by said support housing (5) and operatively connected to said inner adjustment ring (19) for moving said inner adjustment ring to radially adjust the position of said ring sectors (7), said position adjusting mechanism further comprising at least one spring (6) inserted between said support housing (5) and said radially outwardly facing surface of each respective ring sector of said plurality of ring sectors (7) for applying a radially inward biasing force to said respective ring sector to bear with its radially inwardly facing slanted surface (17) against said radially outwardly slanting surface (17') of said inner adjustment ring (19), whereby said biasing force of said spring (6) causes a radially inwardly directed motion of said ring sectors (7) while said inner ring (19) causes a radially outwardly directed motion of said ring sectors (7) against said biasing force of said spring (6) in response to a force applied by said further drive (12).

12. The apparatus of claim 11, wherein said further drive comprises at least one piston cylinder device (12) mounted in said support housing (5) and operatively connected to said inner adjustment ring for moving said inner adjustment ring axially, whereby said ring sectors are movable radially outwardly against said biasing force or radially inwardly by said biasing force depending on the movement direction of said inner ring (19).

13. The apparatus of claim 11, further comprising at least one guide member (13) rigidly connected to each of said ring sectors (7) and slidably received in a respective guide slot (14) for radially guiding said ring sectors (7).

14. The apparatus of claim 13, wherein said guide members are screws (13) slidably mounting said ring sectors (7) in said support housing (5).

15. The apparatus of claim 1, wherein said ring row is circular.

16. An apparatus for improving the running quality of vehicle wheels of different sizes having air tires on rims, said apparatus comprising a machine frame (2), a support housing (5), a drive (3) movably securing said support housing to said machine frame (2) for moving said support housing in a pressure application direction, at least one pressure application ring (26) mounted in said support housing (5), said pressure application ring (26) comprising a plurality of position adjustable ring sectors mounted in a ring row in said support housing (5) for adjusting said ring sectors radially for increasing or decreasing a diameter of said pressure application ring (26) in accordance with said different sizes, each of said ring sectors having a projection (8) for contacting a tire flank surface (9, 21), said apparatus further comprising overlap elements (30, 32, 34, 36) extending from ends of said ring sectors in the circumferential direction for bridging circumferential gaps (37) between neighboring ring sectors when said ring sectors are adjusted to form said pressure application ring with a diameter larger than a given minimum diameter ($D_{MIN}$).

\* \* \* \* \*

UNITED STATES PATENT AND TRADEMARK OFFICE
CERTIFICATE OF CORRECTION

PATENT NO. : 6,076,586

DATED : June 20, 2000

INVENTOR(S) : HANS

It is certified that error appears in the above-identified patent and that said Letters Patent is hereby corrected as shown below:

On the Title Page: under [57] ABSTRACT, line 12, after "their", replace "radially" by --radial position--;

Col. 1, line 32,     before "is", insert --It--;

Col. 5, line 46,     after "its", replace "sector" by --tongued ring sector 35--;

Col. 6, line 29,     before "housing", delete "by".

Signed and Sealed this

First Day of May, 2001

NICHOLAS P. GODICI

*Attest:*

*Attesting Officer*      *Acting Director of the United States Patent and Trademark Office*